United States Patent
Kumawat et al.

(10) Patent No.: US 11,809,415 B2
(45) Date of Patent: *Nov. 7, 2023

(54) METHOD AND SYSTEM FOR DATA LOCALIZATION-COMPLIANT BLOCKCHAIN PROCESSING AND STORAGE

(71) Applicant: MASTERCARD INTERNATIONAL INCORPORATED, Purchase, NY (US)

(72) Inventors: Jaipal Singh Kumawat, Rajasthan (IN); Gurpreet Atwal, Chesterfield, MO (US); Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,413

(22) Filed: Mar. 25, 2022

(65) Prior Publication Data

US 2022/0215015 A1 Jul. 7, 2022

Related U.S. Application Data

(63) Continuation of application No. 16/520,454, filed on Jul. 24, 2019, now Pat. No. 11,301,459.

(51) Int. Cl.
*G06F 16/23* (2019.01)
*H04L 9/06* (2006.01)
(Continued)

(52) U.S. Cl.
CPC ...... *G06F 16/2379* (2019.01); *G06F 16/2365* (2019.01); *H04L 9/0637* (2013.01);
(Continued)

(58) Field of Classification Search
None
See application file for complete search history.

(56) References Cited

U.S. PATENT DOCUMENTS

2016/0055583 A1    2/2016  Liberty et al.
2017/0011460 A1*   1/2017  Molinari ............... G06Q 40/06
(Continued)

OTHER PUBLICATIONS

Kussy, M. Y., Pobirchenko, V. V., Shutaieva, E. A., & Kakutich, Y. Y. (2018). Blockchain technologies as a stimulator of institutional transformations of the world financial system. International Journal of Engineering and Technology (UAE), 7(3.14), 354-359. (Year: 2018).*

(Continued)

*Primary Examiner* — Uyen T Le
(74) *Attorney, Agent, or Firm* — Panitch Schwarze Belisario & Nadel LLP

(57) ABSTRACT

A method for ensuring compliance with data localization rules and regulations for blockchain data values in a blockchain network includes: a local node in a first country receiving a submission for a new blockchain transaction; identifying that the new blockchain transaction involves at least one entity in a foreign country; confirming the new blockchain transaction; transmitting the confirmed blockchain transaction to a foreign node located in the foreign country; generating a new block in the local node that includes the confirmed blockchain transaction; and distributing the new block to other nodes located in the same country as the local node.

11 Claims, 5 Drawing Sheets

(51) Int. Cl.
      *H04L 9/32*       (2006.01)
      *H04L 9/30*       (2006.01)
      *H04L 9/00*       (2022.01)

(52) U.S. Cl.
      CPC ............. *H04L 9/30* (2013.01); *H04L 9/3247* (2013.01); *H04L 9/50* (2022.05)

(56) References Cited

U.S. PATENT DOCUMENTS

| | | | |
|---|---|---|---|
| 2019/0303843 A1* | 10/2019 | O'Brien | H04L 9/3239 |
| 2019/0372756 A1 | 12/2019 | Kim et al. | |
| 2020/0084046 A1* | 3/2020 | Bessonov | H04L 9/321 |
| 2020/0118068 A1 | 4/2020 | Turetsky et al. | |
| 2020/0342136 A1 | 10/2020 | Murdoch et al. | |
| 2022/0122075 A1* | 4/2022 | Bardouille | G06Q 20/405 |

OTHER PUBLICATIONS

Rawat, Danda B., and Amani Alshaikhi. "Leveraging distributed blockchain-based scheme for wireless network virtualization with security and QoS constraints." 2018 International Conference on Computing, Networking and Communications (ICNC). IEEE, 2018. 5 pages. (Year: 2018).*

Cermeño, Javier Sebastian. "Blockchain in financial services: Regulatory landscape and future challenges for its commercial application." BBVA Research Paper 16.20 (2016): 1-33. (Year: 2016).*

Hileman, Garrick, and Michel Rauchs. "2017 global blockchain benchmarking study." Available at SSRN 3040224 (2017). 121 pages. (Year: 2017).*

* cited by examiner

METHOD AND SYSTEM FOR DATA LOCALIZATION-COMPLIANT BLOCKCHAIN PROCESSING AND STORAGE

FIELD

The present disclosure relates to ensuring compliance with data localization requirements for blockchain processing and storage, specifically by having blockchain transactions submitted to and stored in nodes associated with countries associated with each blockchain wallet involved in a transaction.

BACKGROUND

Blockchains are typically managed and operated by a plurality of nodes in a decentralized network, where every node participants in the confirmation and distribution of blocks. For larger blockchains, such as those operated for various types of data storage by international corporations or used in the management of cryptographic currency, nodes may be distributed throughout the world. Traditionally, every node in a blockchain stores a copy of the entire blockchain, including every transaction from genesis to the most recent block.

In recent times, some countries and other governing bodies have set rules and regulations regarding data localization. In some cases, these rules require any data associated with an entity residing in a geographic area to be stored in that geographic area. In some instances, any geographic areas not directly associated with the data may be prohibited from obtaining and/or storing this data. Due to these tight regulations and the nature of blockchain, blockchains are typically not compliant with data localization rules and regulations.

Thus, there is a need to improve the architecture and operation of blockchains to be compliant with data localization rules and regulations regarding what jurisdictions may store data regarding entities associated therewith.

SUMMARY

The present disclosure provides a description of systems and methods for ensuring compliance with data localization rules and regulations for blockchain data values in a blockchain network. Nodes in the blockchain network store an index of the countries associated with each blockchain wallet registered with the blockchain, either directly in data storage in or accessible by each node, or through smart contracts stored in the blockchain itself. Due to the nature of geography and the architecture of the network, transactions are submitted to nodes located in the same country as a blockchain wallet. The node identifies if another country is involved in the transaction through identification of the involved wallets, and, if so, transmits the transaction to a node in the other country. Each node will then generate a new block that includes the transaction that is transmitted only to other nodes in its same country. This results in each country having only those transactions involving that country, thus ensuring compliance with data localization rules and regulations. In addition, because each node has a complete collection of all transactions involving wallets located in the country, the accuracy of the blockchain is maintained, without any country storing any data regarding transactions that do not involve the country.

A method for ensuring compliance with data localization rules and regulations for blockchain data values in a blockchain network includes: receiving, by a receiver of a local node in a blockchain network, a new blockchain data value including at least a digital signature, a public key, and a destination address; identifying, by a processing device of the local node, a first country using the public key and a second country using the destination address, where the local node is located in the first country or the second country; transmitting, by a transmitter of the local node, the received new blockchain data value to a foreign node in the blockchain network, where the foreign node is located in (i) the second country if the local node is located in the first country, or (ii) the first country if the local node is located in the second country; generating, by the processing device of the local node, a new block for a blockchain, the new block including a block header and a plurality of blockchain data values, where the plurality of blockchain data values includes at least the received new blockchain data value; and transmitting, by the transmitter of the local node, the generated new block to a plurality of additional nodes in the blockchain network, where each of the plurality of additional nodes are located in (i) the first country if the local node is located in the first country, or (ii) the second country if the local node is located in the second country.

A system for ensuring compliance with data localization rules and regulations for blockchain data values in a blockchain network includes: a local node in a blockchain network located in a first country or a second country; and a foreign node in the blockchain network located in (i) the second country if the local node is located in the first country, or (ii) the first country if the local node is located in the second country, wherein the local node includes a receiver of a local node in a blockchain network configured to receive a new blockchain data value including at least a digital signature, a public key, and a destination address, a processing device configured to identify the first country using the public key and the second country using the destination address, and a transmitter configured to transmit the received new blockchain data value to the foreign node, wherein the processing device is further configured to generate a new block for a blockchain, the new block including a block header and a plurality of blockchain data values, where the plurality of blockchain data values includes at least the received new blockchain data value, and the transmitter is further configured to transmit the generated new block to a plurality of additional nodes in the blockchain network, where each of the plurality of additional nodes are located in (i) the first country if the local node is located in the first country, or (ii) the second country if the local node is located in the second country.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Compliance with Data Localization Rules in a Blockchain Network

Figure 1:
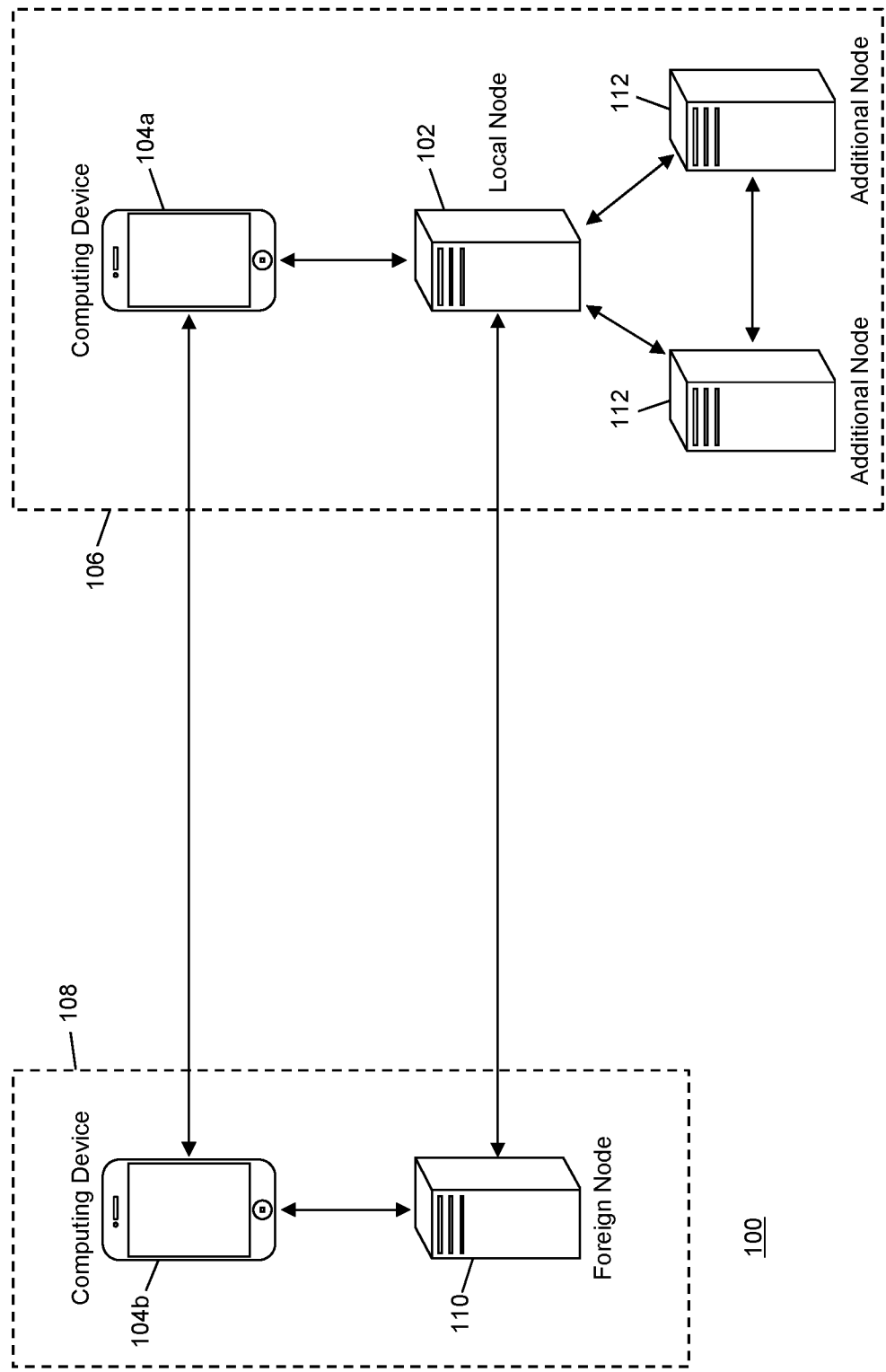
FIG. 1 is a block diagram illustrating a high level system architecture for ensuring data localization compliance in a blockchain network in accordance with exemplary embodiments.

FIG. 1 illustrates a system 100 for ensuring compliance with applicable data localization rules and regulations.

The system 100 may include a local node 102. The local node 102, discussed in more detail below, may be one of a plurality of nodes comprising a blockchain network. The local node 102 may be located in a first country 106 or other defined geographic area that is subject to one or more data localization rules or regulations. The blockchain network 104 may include a plurality of other nodes, including one or more foreign nodes 110 that are located in a second country 108 or other defined geographic area also subject to the same and/or other data localization rules or regulations, as well as a plurality of additional nodes 112 also located in the first country 106.

Figure 2:
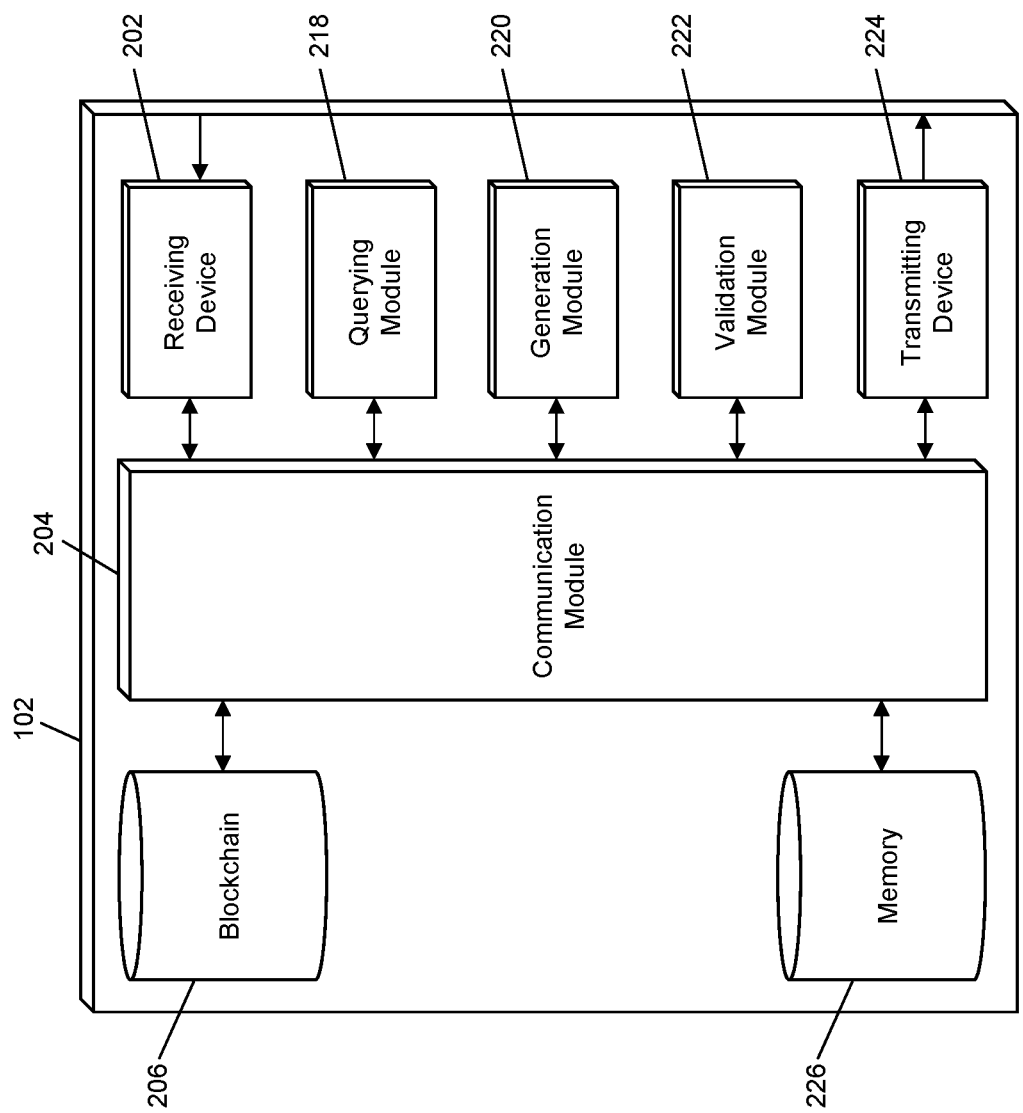
FIG. 2 is a block diagram illustrating the local node of the system of FIG. 1 for ensuring data localization compliance in a blockchain network in accordance with exemplary embodiments.
Figure 5:
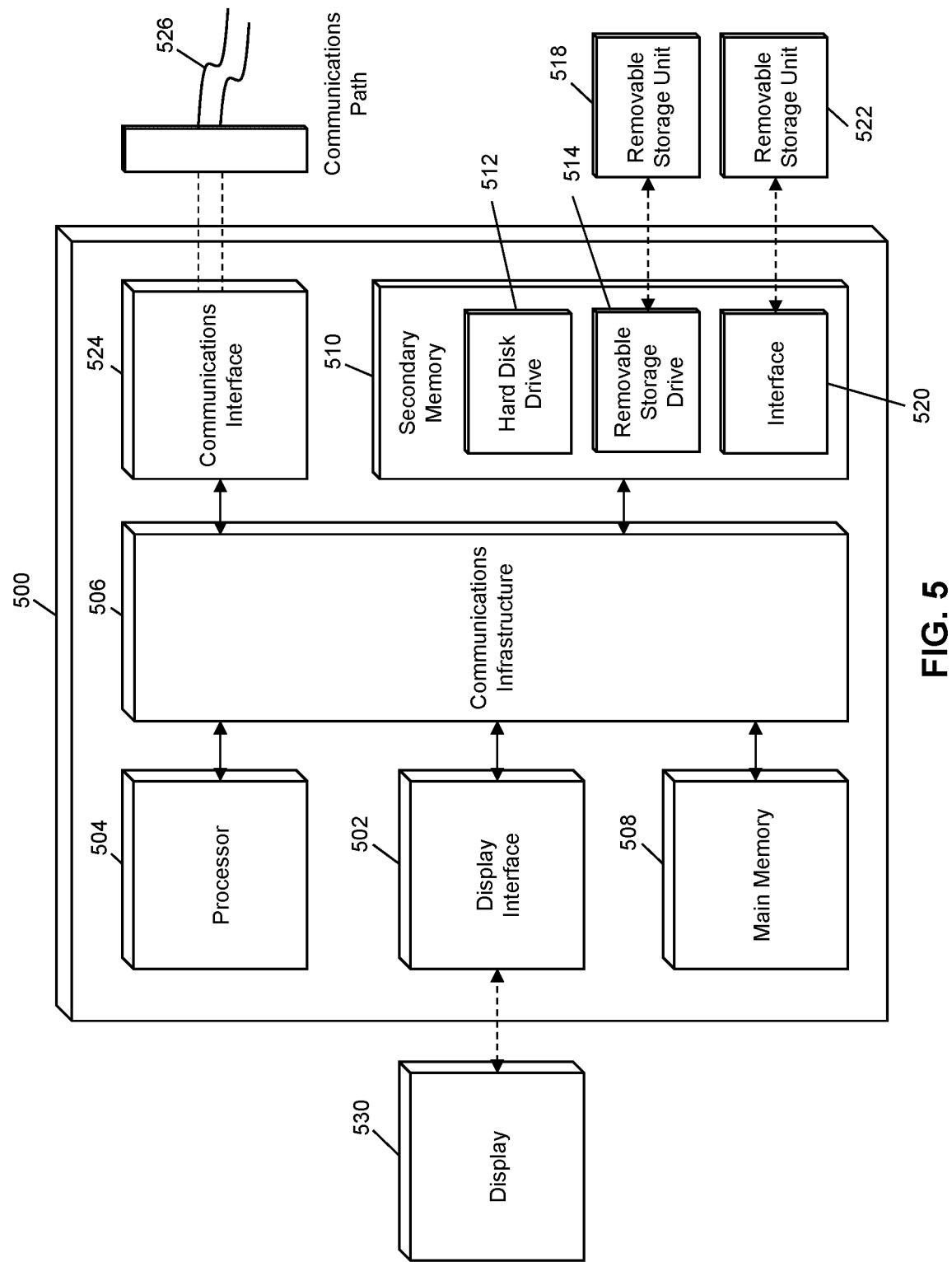
FIG. 5 is a block diagram illustrating a computer system architecture in accordance with exemplary embodiments.

The blockchain network may be comprised of these nodes 102, 110, and 112. Each node may be a computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device 104 that stores the private key for use thereof in blockchain transactions. For instance, each computing device 104 may each have their own private key for respective cryptographic key pairs, and may each be a blockchain wallet for use in transactions with the blockchain associated with the blockchain network. Computing devices 104 may be any type of device suitable to store and utilize a blockchain wallet, such as a desktop computer, laptop computer, notebook computer, tablet computer, cellular phone, smart phone, smart watch, smart television, wearable computing device, implantable computing device, etc.

In other embodiments, the blockchain may be used to store any other type of data in an immutable format. For instance, a blockchain may be used to track ownership of land deeds, where changes in ownership may be recorded as direct transfers (e.g., similar to transfers of currency) or where changes may be stored as data. In another example, a blockchain may be used for voting, where votes may be attributed to blockchain wallets and counted accordingly. Other uses for a blockchain for data storage will be apparent to persons having skill in the relevant art. As discussed herein, the storage of any data in a blockchain may be referred to as a "transaction." For instance, in the above example, a change in ownership in land deed or a casted vote in an election may be a "transaction" stored in the blockchain.

Each blockchain data value stored in the blockchain may correspond to a blockchain transaction or other storage of data, as applicable. A blockchain transaction may consist of at least: a digital signature of the sender of currency that is generated using the sender's private key, a blockchain address of the recipient of currency generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a node in the blockchain network, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), and then include the blockchain transaction in a new block. The new block may be validated by other nodes in the blockchain network before being added to the blockchain and distributed to all of the nodes in the blockchain network in traditional blockchain implementations. In cases where a blockchain data value may not be related to a blockchain transaction, but instead the storage of other types of data, blockchain data values may still include or otherwise involve the validation of a digital signature.

In the system 100, a computing device 104a located in the first country 106 may interact with a computing device 104b located in the second country 108 for a new transaction. The computing device 104b may provide the computing device 104a with its public key or a blockchain address generated therefrom. In cases where the computing device 104b provides its public key to the computing device 104a, the computing device 104a may be configured to generate a blockchain address using the public key. The computing device 104a may also generate a digital signature using its own private key, and identify any other data necessary for confirmation of a blockchain transaction, such as unspent transaction outputs, currency amounts, etc. The computing device 104a may submit data for a new blockchain data value for the new transaction to the local node 102 also located in the same country 106 as the computing device 104a using a suitable communication network and method.

The submission may include at least the digital signature, the public key of the cryptographic key pair of the computing device 104a, the blockchain address generated for the computing device 104b, and any other data to be included in the new blockchain data value. The local node 102 may identify the country in which each entity involved in the new blockchain transaction is located. In some embodiments, data may be stored directly in or in a location accessible by the local node 102 that includes an identifier, such as a public key, for each computing device 104 and the associated country. For instance, prior to or during the first time that a blockchain wallet interacts with the blockchain (e.g., the first time it is used to receive currency in such blockchains), the blockchain wallet may provide its public key and the country in which it is located to a local node 102. Such information may then be stored in the local node 102 or in another accessible location, and distributed to every additional node 112 in the same country. In other embodiments, such data may be stored in smart contracts that are added to the blockchain, where a public key may be input into a smart contract with the smart contract producing the associated country based thereon.

The local node 102 may accordingly identify that the computing device 104a is located in the first country 106 using its associated public key included in the submission. The local node 102 may also identify that the computing device 104b is located in the second country 108, using the destination blockchain address included in the submission. In some cases, the address may be unsuitable for use as an identifier. In such cases, the submission may also include the public key provided by the computing device 104b. In these cases, the local node 102 may identify the second country 108 using this additional public key included in the submitted data.

The local node 102 may be configured to confirm the new blockchain data value. Confirmation of the blockchain data value may include validation of the digital signature using the public key of the cryptographic key pair that includes the private key used to generate the digital signature (e.g., associated with the computing device 104a). Additional actions performed by the local node 102 for confirmation of a blockchain data value may vary based on the implementation of the blockchain and use thereof. For instance, in cases where a blockchain is used for voting in a public election, confirmation may include verifying that no prior votes were cast for the same election by that same blockchain wallet. In cases where a blockchain is used for transfers of cryptographic currency, confirmation may include confirming that each transaction input is unspent and that the overall currency controlled thereby exceeds the transaction amount for the submitted transaction.

If the new blockchain data value is confirmed, then the local node 102 may electronically transmit the new blockchain data value to a foreign node 110 located in the second country 108 using a suitable communication network and method. The foreign node 110 may be the same as a local node 102, but located in its own, separate second country 108. The local node 102 may generate a new block for the blockchain that includes a new block header and a plurality of blockchain data values, including the new blockchain data value. The foreign node 110 may do the same with its own blockchain data values and the new blockchain data value. The local node 102 may then distribute the new block to additional nodes 112 in the first country 106, where the additional nodes 112 may confirm and approve the block. The block may then be distributed to all nodes in the first country 106. Likewise, the foreign node 110 may distribute its new block to other nodes in the second country 108 for confirmation and eventual distribution to all nodes in the second country 108.

The result is that any blockchain transaction involving an entity associated with a country will be stored in all nodes in that same country. Because transactions are confirmed in its own local country 106 prior to transmission to a foreign country 108, each blockchain data value stored in a node has been confirmed and can be used in future transactions without risk to the immutability of the blockchain. At the same time, because each blockchain data value stored in a node is directly associated with an entity associated with the same country, every node is compliant with the data localization rules and requirements applicable thereto. Thus, the methods and systems discussed herein provide for compliance with data localization in a blockchain network without sacrificing the benefits of a blockchain through the architecture of nodes and communications between the nodes.

Blockchain Nodes

FIG. 2 illustrates an embodiment of a local node 102 in the system 100. It will be apparent to persons having skill in the relevant art that the embodiment of the local node 102 illustrated in FIG. 2 is provided as illustration only and may not be exhaustive to all possible configurations of the local node 102 suitable for performing the functions as discussed herein. For example, the computer system 500 illustrated in FIG. 5 and discussed in more detail below may be a suitable configuration of the local node 102. In some cases, each foreign node 110 and additional node 112 in the blockchain network in the system 100 may be configured similar to the local node 102 in FIG. 2 or computer system 500 in FIG. 5, such as including the components illustrated therein.

The local node 102 may include a receiving device 202. The receiving device 202 may be configured to receive data over one or more networks via one or more network protocols. In some instances, the receiving device 202 may be configured to receive data from computing devices 104, foreign nodes 110, additional nodes 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104 that are superimposed or otherwise encoded with data for new blockchain data values, the data including, for instance, a digital signature and an associated public key, destination address and an associated public key, and transactional data, such as input transactions and currency amounts, casted votes, land deed data, etc. The receiving device 202 may be configured to receive data signals electronically transmitted by foreign nodes 110 that are superimposed or otherwise encoded with confirmed blockchain data values, such as for transactions originating in the second country 108 where the foreign node 110 may have operated as a local node 102 for that transaction and the local node 102 performing the functions of a foreign node 110. The receiving device 202 may also be configured to receive data signals electronically transmitted by additional nodes 112 in the first country 106, which may be superimposed or otherwise encoded with block confirmations, new blocks, new blockchain data values for the first country 106, and other data used in the operation and management of a blockchain.

The local node 102 may also include a communication module 204. The communication module 204 may be configured to transmit data between modules, engines, databases, memories, and other components of the local node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the local node 102 and external components of the local node 102, such as externally connected databases, display devices, input devices, etc. The local node 102 may also include a processing device. The processing device may be configured to perform the functions of the local node 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The local node 102 may include blockchain data 206. The blockchain data 206 may be comprised of a plurality of blocks, where each block includes a block header and one or more blockchain data values. Each block header may include at least a timestamp, block reference value, and data reference value. In some embodiments, a block header may also include a nonce such that a hash of the block header may have a predefined trait. In exemplary embodiments, the blockchain data 206 stored in a local node 102 may include only blockchain data values that involve a computing device 104 located in the first country 106. The blockchain data 206 may also include a smart contract used to identify the country associated with a public key, or may include data pairs of public keys and associated countries.

The local node 102 may include a querying module 218. The querying module 218 may be configured to execute queries on databases to identify information. The querying module 218 may receive one or more data values or query strings, and may execute a query string based thereon on an indicated database, such as a memory 226 of the local node 102 to identify information stored therein. The querying module 218 may then output the identified information to an appropriate engine or module of the local node 102 as necessary. The querying module 218 may, for example, execute a query on the memory 226 of the local node 102 to identify the country associated with a public key included in a new submission for a blockchain transaction, or on the blockchain data 206 to identify data for use in confirming a new submission for a blockchain transaction.

The local node 102 may also include a generation module 220. The generation module 220 may be configured to generate data for use by the local node 102 in performing the functions discussed herein. The generation module 220 may receive instructions as input, may generate data based on the instructions, and may output the generated data to one or more modules of the local node 102. For example, the generation module 220 may be configured to generate new blockchain data values, generate new block headers, generate new blocks, generate block and/or transaction reference values through hashing, etc.

The local node 102 may also include a validation module 222. The validation module 222 may be configured to perform validations and verifications for the local node 102 as part of the functions discussed herein. The validation module 222 may receive instructions as input, which may include data to be validated and/or data to be used in the validation. The validation module 222 may perform a validation or verification as requested, and may output a result of the validation to another module or engine of the local node 102. The validation module 222 may, for example, be configured to validate digital signatures included in received new submissions for blockchain data values using public keys included therein. The validation module 222 may also be configured to confirm blockchain data values, where functions performed in the confirmation thereof may be based on the implementation of the blockchain and use for the data stored therein.

The local node 102 may also include a transmitting device 224. The transmitting device 224 may be configured to transmit data over one or more networks via one or more network protocols. In some instances, the transmitting device 224 may be configured to transmit data to computing devices 104, foreign nodes 110, additional nodes 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to computing devices 104 that are superimposed or otherwise encoded with data confirmations, such as for new blockchain data value submissions, or requests for data, such as for country information for a blockchain wallet or for a public key associated with a blockchain wallet. The transmitting device 224 may also be configured to transmit data signals to foreign nodes 110, which may be superimposed or otherwise encoded with confirmed blockchain data values that involve a blockchain wallet associated with the second country 108. The transmitting device 224 may also be configured to transmit data signals to additional nodes 112 in the first country 106 that may be superimposed or otherwise encoded with new blockchain data values, new blocks for confirmation, confirmation messages for received blocks, and other data used in the management and operation of the blockchain.

The local node 102 may also include a memory 226. The memory 226 may be configured to store data for use by the local node 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the local node 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, additional blockchain data, hashing algorithms for generating blocks, credentials for validation, usage rule templates, communication data for foreign nodes 110 and additional nodes 112 communication data for computing devices 104, smart contracts, computing device location data, signature generation and verification algorithms, address generation algorithms, etc.

Process for Data Localization Compliance in a Blockchain Network

Figure 3:
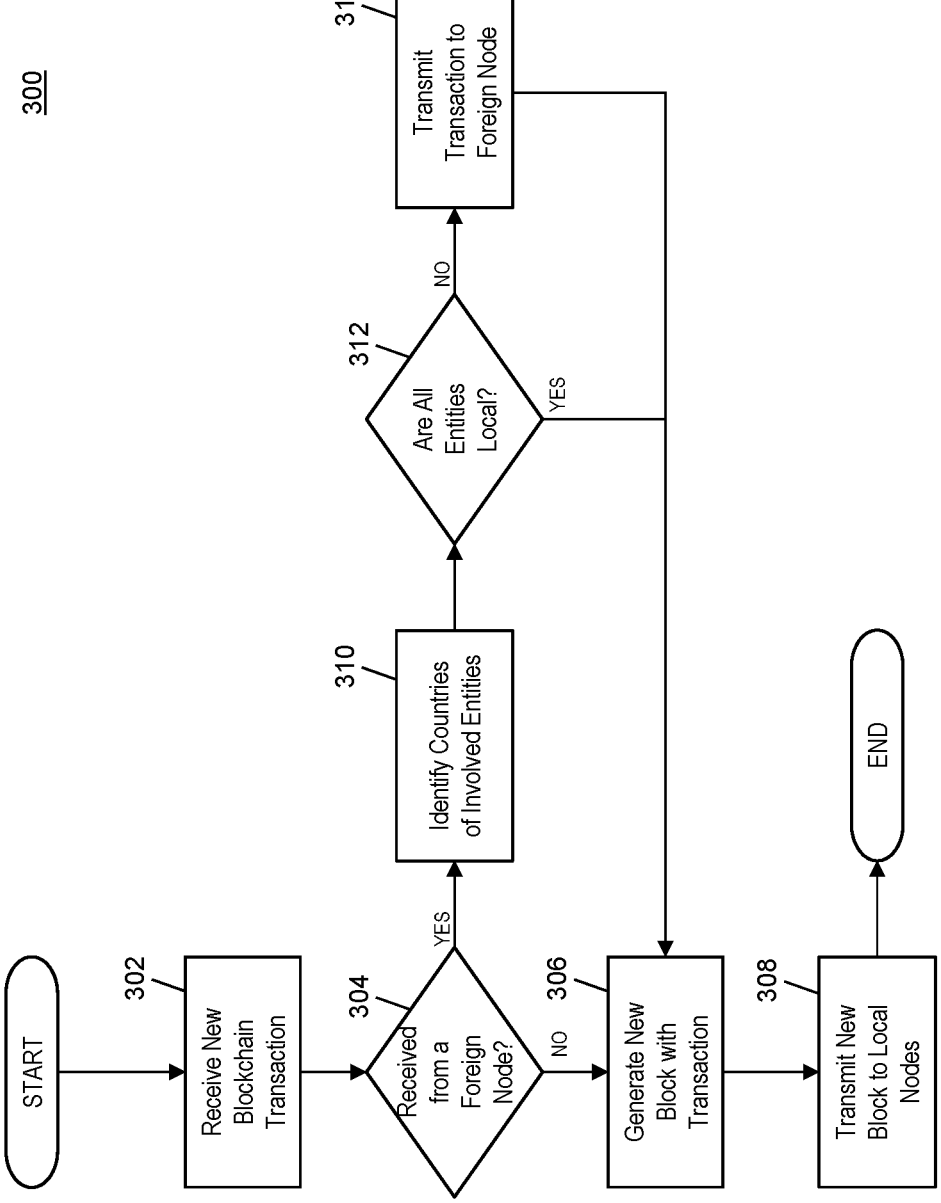
FIG. 3 is a flow diagram illustrating a process for ensuring data localization compliance in a blockchain network executed by the local node of FIG. 2 in the system of FIG. 1 in accordance with exemplary embodiments.

FIG. 3 illustrates an example process 300 executed by the local node 102 in the system 100 of FIG. 1 for ensuring compliance with data localization rules and requirements in a blockchain network.

In step 302, the receiving device 202 of the local node 102 may receive a new blockchain transaction. The new blockchain transaction may include the data included in a suitable blockchain data value for the blockchain, including at least a public key, destination address, and one or more additional values. In step 304, the local node 102 may determine if the new blockchain transaction was received from a foreign node 110 in the blockchain network. If the blockchain transaction was not received from a foreign node 110, then the blockchain transaction may be a confirmed blockchain data value for the new blockchain transaction. Then, in step 306, the generation module 220 of the local node may generate a new block header and a new block for the blockchain that includes one or more blockchain data values, including the new blockchain data value received from the foreign node 110. In step 308, the transmitting device 224 of the local node 102 may electronically transmit the new block to one or more additional nodes 112 in the first country 106 for confirmation thereof and adding to the blockchain.

If, in step 304, the local node 102 determines that the data for the new blockchain transaction was received from a foreign node 110, then the data may have been received from a computing device 104 located in the first country 106. Then, in step 310, the querying module 218 of the local node 102 may execute queries on the memory 226 and/or blockchain data 206 of the local node 102 to identify the countries associated with each entity involved in the new blockchain transaction. The identification may be based on the public key and destination address (e.g., or a different public key associated therewith, if applicable). In step 312, the local node 102 may determine if every involved entity is located in the first country 106. If so, the process 300 may proceed to step 306 where the local blockchain transaction is added to a new block that is distributed to additional nodes 112 in the first country 106.

If, in step 312, the local node 102 identifies that one of the entities involved is associated with the first country 106, and that another entity involved is associated with the second country 108, then the process 300 may proceed to step 314. In cases where more than two entities may be involved in a transaction, additional countries may be associated therewith. In those cases, the additional countries may be treated similar to additional second countries 108 as discussed herein. In step 314, the transmitting device 224 of the local node 102 may electronically transmit the new blockchain data value to a foreign node 110 in each additional country identified in step 312. In some embodiments, the validation module 222 of the local node 102 may first confirm the new blockchain transaction prior to transmission of the new blockchain data value to foreign node(s) 110. The process 300 may then proceed to step 306, where the new blockchain data value is included in a new block that is generated and distributed to additional nodes 112 in the first country 106.

Exemplary Method for Ensuring Compliance with Data Localization Rules

Figure 4:
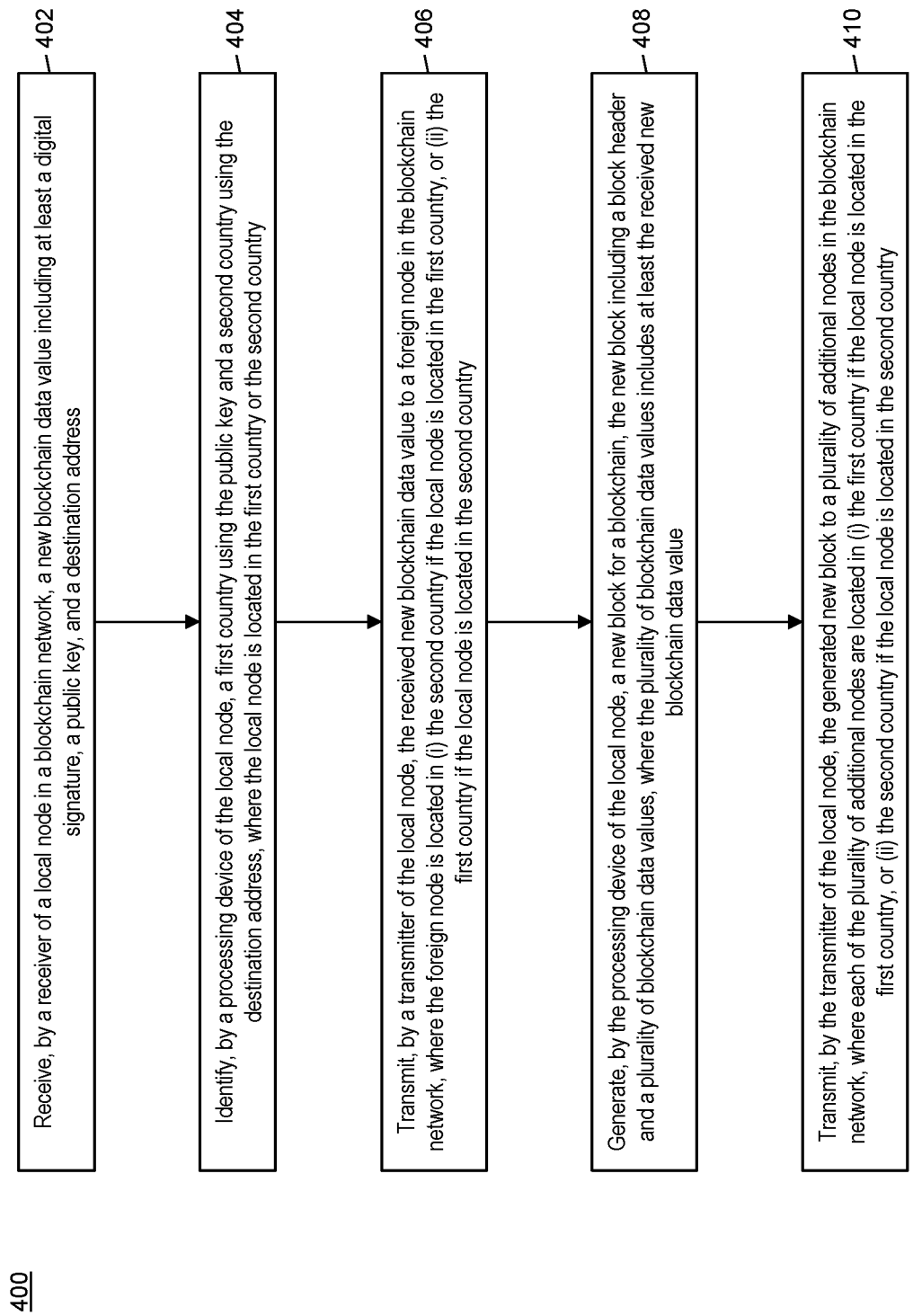
FIG. 4 is a flow chart illustrating an exemplary method for ensuring compliance with data localization rules and regulations for blockchain data values in a blockchain network in accordance with exemplary embodiments.

FIG. 4 illustrates a method 400 for ensuring data compliance with local rules and regulations in a blockchain network through the identification of involved countries and controlled distribution of blockchain data values for new transactions.

In step 402, a new blockchain data value may be received by a receiver (e.g., the receiving device 202) of a local node (e.g., the local node 102) in a blockchain network, the new blockchain data value including at least a digital signature, a public key, and a destination address. In step 404, a first country (e.g., the first country 106) may be identified using the public key and a second country (e.g., the second country 108) identified using the destination address by a processing device (e.g., the querying module 218) of the local node, where the local node is located in the first country or the second country. In step 406, the received new blockchain data value may be transmitted to a foreign node (e.g., the foreign node 110) in the blockchain network, where the foreign node is located in (i) the second country if the local node is located in the first country, or (ii) the first country if the local node is located in the second country.

In step 408, a new block for a blockchain may be generated by the processing device (e.g., the generation module 220) of the local node, the new block including a block header and a plurality of blockchain data values, where the plurality of blockchain data values includes at least the received new blockchain data value. In step 410, the generated new block may be transmitted by the transmitter of the local node to a plurality of additional nodes (e.g., additional nodes 112) in the blockchain network, where each of the plurality of additional nodes are located in (i) the first country if the local node is located in the first country, or (ii) the second country if the local node is located in the second country.

In one embodiment, the new blockchain data value may received from a computing device (e.g., the computing device 104a) located in (i) the first country if the local node is located in the first country, or (ii) the second country if the local node is located in the second country. In some embodiments, the transmitting step may be skipped if the new blockchain data value is received from the foreign node. In one embodiment, the new blockchain data value may include an input transaction reference in place of the public key, and the method 400 may further include identifying, by the processing device of the local node, the public key in a past blockchain data value stored in a blockchain associated with the blockchain network based on the input transaction reference.

In some embodiments, the first country and the second country may be identified by supplying the public key and the destination address as inputs to one or more smart contracts. In one embodiment, the method 400 may also include receiving, by the receiver of the local node, a confirmation message from the foreign node for the new blockchain data value. In a further embodiment, the confirmation message may be received prior to generating the new block. In some embodiments, the method 400 may further include validating, by the processing device of the local node, the digital signature using the public key prior to transmitting the new received blockchain data value.

Computer System Architecture

FIG. 5 illustrates a computer system 500 in which embodiments of the present disclosure, or portions thereof, may be implemented as computer-readable code. For example, the local node 102, foreign node 110, and additional nodes 112 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for ensuring compliance with data localization rules and regulations for blockchain data values in a blockchain network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for improving compliance with data localization requirements for blockchain data values in a blockchain network, comprising:
    receiving, by a local node in a blockchain network, a new blockchain data value including at least a public key and a destination address;
    identifying, by the local node, a first defined geographic area that is subject to one or more data localization rules or regulations using the public key and a second defined geographic area that is subject to one or more data localization rules or regulations using the destination address, where the local node is located in the first defined geographic area or the second defined geographic area;
    transmitting, by the local node, the received new blockchain data value to a foreign node in the blockchain network, where the foreign node is located in (i) the second defined geographic area if the local node is located in the first defined geographic area, or (ii) the first defined geographic area if the local node is located in the second defined geographic area;
    generating, by the local node, a new block for a blockchain, where the generated new block includes at least the received new blockchain data value; and
    transmitting, by the local node, the generated new block to a plurality of additional nodes in the blockchain network.

2. The method of claim 1, wherein the new blockchain data value is received from a computing device located in (i) the first defined geographic area if the local node is located in the first defined geographic area, or (ii) the second defined geographic area if the local node is located in the second defined geographic area.

3. The method of claim 1, wherein the transmitting step is skipped if the new blockchain data value is received from the foreign node.

4. The method of claim 1, wherein
    the new blockchain data value includes an input transaction reference in place of the public key, and
    the method further comprises:
    identifying, by the local node, the public key in a past blockchain data value stored in a blockchain associated with the blockchain network based on the input transaction reference.

5. The method of claim 1, wherein the first defined geographic area and the second defined geographic area are identified by supplying the public key and the destination address as inputs to one or more smart contracts.

6. The method of claim 1, further comprising:
    receiving, by the local node, a confirmation message from the foreign node for the new blockchain data value.

7. The method of claim 6, wherein the confirmation message is received prior to generating the new block.

8. The method of claim 1, further comprising:
    validating, by the local node, a digital signature included in the new blockchain data value using the public key prior to transmitting the new received blockchain data value.

9. A system for improving compliance with data localization requirements for blockchain data values in a blockchain network, comprising:
    a local node in a blockchain network located in a first defined geographic area that is subject to one or more data localization rules or regulations or a second defined geographic area that is subject to one or more data localization rules or regulations; and
    a foreign node in the blockchain network located in (i) the second defined geographic area if the local node is located in the first defined geographic area, or (ii) the first defined geographic area if the local node is located in the second defined geographic area, wherein
    the local node is configured to:
        receive a new blockchain data value including at least, a public key, and a destination address,
        identify the first defined geographic area using the public key and the second defined geographic area using the destination address,
        transmit the received new blockchain data value to the foreign node,
        generate a new block for a blockchain, the new block including at least the received new blockchain data value, and
        transmit the generated new block to a plurality of additional nodes in the blockchain network.

10. The system of claim 9, wherein the new blockchain data value is received from a computing device located in (i) the first defined geographic area if the local node is located in the first defined geographic area, or (ii) the second defined geographic area if the local node is located in the second defined geographic area.

11. The system of claim 9, wherein transmission of the generated new block is skipped if the new blockchain data value is received from the foreign node.

* * * * *